May 13, 1952   J. VAN SLOOTEN   2,596,623
RADIO-FREQUENCY OSCILLATOR POWER SUPPLY SYSTEM
Filed Feb. 18, 1948

INVENTOR.
JACOB VAN SLOOTEN
BY
AGENT.

Patented May 13, 1952

2,596,623

UNITED STATES PATENT OFFICE 2,596,623

RADIO-FREQUENCY OSCILLATOR POWER SUPPLY SYSTEM

Jacob van Slooten, Eindhoven, Netherlands, assignor to Hartford National Bank and Trust Company, Hartford, Conn., as trustee Application February 18, 1948, Serial No. 9,174
In the Netherlands March 8, 1947

8 Claims. (Cl. 250—36)

For producing comparatively high direct voltages such as, for instance, the anode voltage of approximately 2000 volts or more required for cathode-ray tubes, it is known to step up, rectify and smooth the alternating voltages produced by means of an oscillator comprising a back-coupled electron-discharge tube.

In such arrangements a judicious choice of the frequency of the produced alternating voltages permits the use of a particularly cheap transformer and smoothing filter.

A conventional device of this kind comprises an oscillator circuit with a back-coupled grid-controlled electron discharge tube, the output circuit of which comprises a hypercritically coupled band-pass filter, from which the back-coupling voltage is taken and which functions at the same time as a transformer. (Proceedings I. R. E., April 1943, pages 158 to 163.)

A disadvantage of this known circuit-arrangement consists in its comparatively high apparent internal resistance.

According to the invention, in using an oscillator circuit-arrangement of the aforesaid type, this drawback is met by constructing the back-coupling circuit in such manner that the output voltage of the back-coupling circuit, as compared with the input voltage thereof, comprises a considerable wattless component (phase-angle between input and output voltage of the back-coupling circuit at least 30°).

Particularly in using a screen-grid tube as an oscillator tube the measure according to the invention is advantageous.

We have found that a flatter load curve in using the invention is due to the fact that in this event at least the oscillator frequency substantially corresponds to the central band-pass filter frequency and that a hypercritically coupled band-pass filter has properties resembling those of an inverting network with respect to the central band-pass filter frequency. The latter has already been stated in pages 41 and 42 of a thesis by the inventor J. V. Slooten of the present invention and published May 22, 1946, by the N. V. Philips Lamp Works Laboratory of Eindhoven, Holland, the thesis being entitled "Geometrical Considerations in Connection with the Theory of Electrical Quadripoles."

In order that the invention may be more clearly understood and readily carried into effect it will now be described more fully with reference to the accompanying drawing, given by way of example.

In the drawing corresponding elements bear the same reference numerals.

Figure 1:
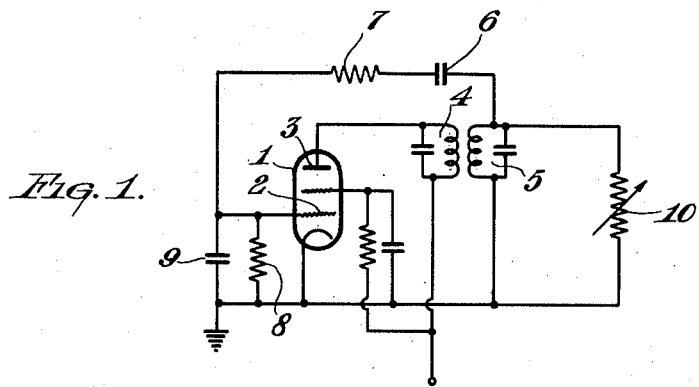
Fig. 1 represents one form of construction of the oscillator-circuit according to the invention.

The oscillator circuit shown in Fig. 1 comprises a back-coupled electron-discharge tube 1 having a control grid 2, a screen grid and an anode 3. The anode circuit of the tube comprises a hypercritically coupled band-pass filter having a primary and a secondary circuit 4 and 5 respectively. The band-pass filter curve $a$ by which the voltage E appearing at the output side of the band-pass filter with a constant input current is represented as a function of the frequency $f$, is shown in Fig. 2, whereas without using the invention the load curve, on loading the circuit by a variable ballast impedance 10, varies as indicated by curve $b$ in Fig. 3.

The back-coupling voltage taken from the secondary circuit 5 of the band-pass filter is supplied to the control-grid 2 of the tube through a blocking condenser 6 and a high resistance 7, which control-grid is connected to the cathode of the tube through a leakage resistance 8 with parallel-condenser 9. According to the invention the different circuit elements of the back-coupling circuit are so proportioned as to produce a phase-angle of approximately 80° between the input and output voltage thereof.

Figure 2:
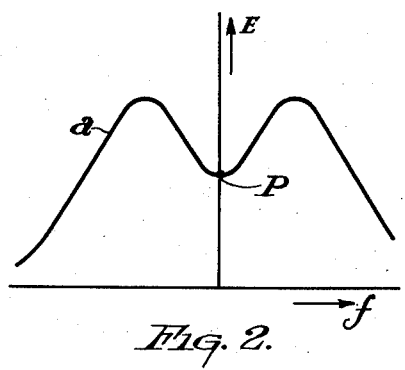
Fig. 2 shows the curve of the band-pass filter used therein.

In the conventional circuit-arrangement of the present type the back-coupling voltage is supplied without phase-displacement to the control grid 2 and the frequency of the oscillations produced corresponds with that for one of the peaks of the band-pass filter curve $a$ in Fig. 2.

Due to the phase-displacement introduced into the back-coupling circuit, the frequency of the generated oscillations will substantially correspond to the central band-pass filter frequency, for which frequency the output voltage of the band-pass filter is displaced in phase by 90° with respect to the input current. The closer the phase-displacement introduced into the back-coupling circuit approaches 90° (270°, 450° . . . and so on) the closer will the frequency of the generated oscillations correspond to the central band-pass filter frequency, the working point for the oscillator-circuit corresponding to the point P in Fig. 2 and the load curve exhibiting a flatter form owing to the aforesaid properties of the hypercritically coupled band-pass filter which correspond to those of an inverting network. In this connection it is at the same time advantageous to use a highly hypercritical coupling i. e. a coupling in which the coupling factor is 5 to 10 times as high as that for a critical coupling.

Figure 3:
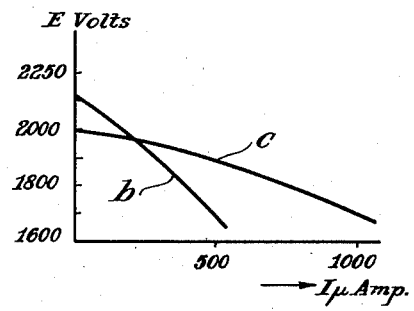
Fig. 3 shows the load curves for the circuit shown in Fig. 1 without the use of the invention.

In Fig. 3 the reference c denotes the load curve obtained by means of the circuit shown in Fig. 1 in using the invention, which curve is much flatter than the curve b without using the invention.

Figure 4:
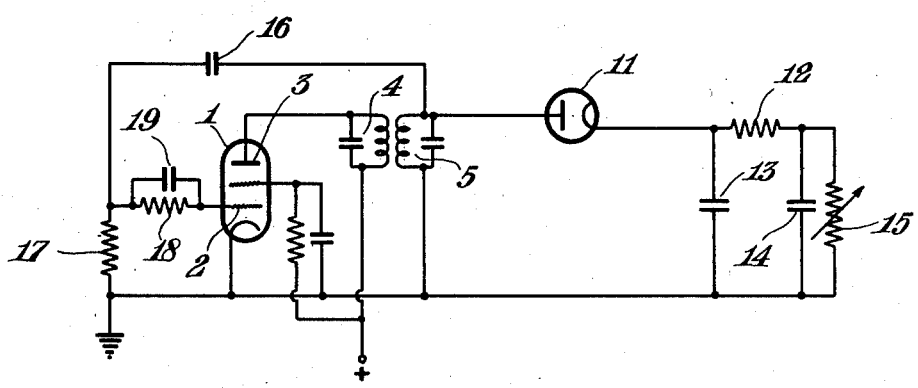
Fig. 4 shows in detail an embodiment according to the invention for producing high direct voltages.

In the device shown in Fig. 4, which represents a variant of the oscillator-circuit shown in Fig. 1, the oscillations generated by the oscillator-circuit are taken from the band-pass filter 4, 5 and supplied, through a rectifier 11 and a smoothing filter comprising a series resistance 12 and shunt-condensers 13, 14, to a variable load resistance 15 which may be constituted by a cathode-ray tube.

In this form of construction the back-coupling circuit of the oscillator circuit-arrangement comprises the series-connection of a condenser 16 and a resistance 17, of which the latter has a comparatively low value, so that a phase-difference of approximately 90° occurs between the voltages across the circuit 5 of the band-pass filter and that set up at the resistance 17. The junction point of condenser 16 and resistance 17 is connected to the control-grid 2 of the oscillator tube through a leakage resistance 18 and a condenser 19 connected in parallel therewith. The condenser 19 is so chosen that the control-grid voltage is practically in phase with the voltage set up at the resistance 17.

It is pointed out that the phase-displacement introduced into the circuit shown in Fig. 1 and that introduced into the circuit shown in Fig. 4 have opposite polarities.

Besides for producing direct anode voltages the oscillator-circuit according to the invention may, of course, be used with advantage wherever a flat load curve is required such as, for instance, in the medical application of high-frequency alternating voltages.

What I claim is:

1. An oscillator comprising an electron discharge tube having a cathode, a grid and an anode and circuits therefor, a band-pass filter constituted by an input resonant circuit and an output resonant circuit, said resonant circuits being arranged in hypercritical coupling relation, said input circuit being coupled to the anode circuit of said tube, and a feedback network coupling said output resonant circuit to the grid circuit of said tube, said feedback network including phase displacement means having a value at which the output voltage of said feedback network as compared to the input voltage thereof exhibits an appreciable wattless component.

2. An oscillator comprising an electron discharge tube having a cathode, a grid and an anode and circuits therefor, a band-pass filter constituted by an input resonant circuit and an output resonant circuit, said resonant circuits being arranged in hypercritical coupling relation, said input circuit being coupled to the anode circuit of said tube, and a feedback network coupling said output circuit to the grid circuit of said tube, said feedback network including phase displacement means having a value at which the phase angle between the output and input voltages of said feedback network is at least 30 degrees.

3. An oscillator, as set forth in claim 2, wherein the factor of coupling between said input and output resonant circuits is in the order of 5 to 10 times as high as that for critical coupling.

4. An oscillator comprising an electron discharge tube having a cathode, a grid, a screen grid and an anode and circuits therefor, a band-pass filter constituted by an input resonant circuit and an output resonant circuit, said resonant circuits being arranged in hypercritical coupling relation, means to apply an anode potential through said input circuit to the anode of said tube, means to apply a constant potential to the screen grid of said tube, and a feedback network coupling said output resonant circuit to the grid circuit of said tube, said feedback network including phase displacement means having a value at which the phase angle between the output and input voltages of said feedback network results in a substantial wattless component.

5. An oscillator comprising an electron discharge tube having a cathode, a grid and an anode, a band-pass filter constituted by an input resonant circuit and an output resonant circuit, said resonant circuits being arranged in hypercritical coupling relation, means to apply an anode potential through said input resonant circuit to said anode, a feedback network coupling said output resonant circuit to the grid of said tube, said feedback network including a first capacitor connected in series with a first resistor and a second capacitor between one end of said output resonant circuit and said cathode, the other end of said resonant circuit being connected to said cathode, the junction of said second capacitor and said first resistor being connected to said grid, and a second resistor connected across said second capacitor, the constants of said feedback network having values imparting a phase displacement at which the output voltage of said feedback network relative to the input voltage thereof exhibits an appreciable wattless component.

6. An oscillator comprising an electron discharge tube having a cathode, a control grid, a screen grid and an anode, a band-pass filter constituted by an input resonant circuit and an output resonant circuit, said resonant circuits being arranged in hypercritical coupling relation, means to apply a constant potential through said input resonant circuit to said anode, a resistance, means to apply said potential through said resistance to said screen grid, a feedback network coupling said output resonant circuit to the control grid of said tube, said feedback network including a first capacitor connected in series with a first resistor and a second capacitor between one end of said output resonant circuit and said cathode, the other end of said resonant circuit being connected to said cathode, the junction of said second capacitor and said first resistor being connected to said control grid, and a second resistor connected across said second capacitor, the constants of said feedback network having values imparting a phase displacement at which the output of said feedback network relative to the input voltage thereof, exhibits an appreciable wattless component.

7. An oscillator comprising an electron discharge tube having a cathode, a grid and an anode, a band-pass filter constituted by an input resonant circuit and an output resonant circuit, said resonant circuits being arranged in hypercritical coupling relation, means to apply an anode potential through said input resonant circuit to said anode, a feedback network coupling said output resonant circuit to the grid of said tube, said feedback network including a capacitor in series with a resistor connected between one end of said output resonant circuit and said cathode, said grid being capacitively coupled to the junction of said capacitor and said resistor, the constants of said feedback network having values at which a 90 degree phase displacement exists between the voltage developed across said output resonant circuit and that developed across said resistor.

8. An oscillator comprising an electron discharge tube having a cathode, a control grid, a screen grid and an anode, a band-pass filter constituted by an input resonant circuit and an output resonant circuit, said resonant circuits being arranged in hypercritical coupling relation, means to apply a constant potential through said input resonant circuit to said anode, means to apply a constant potential to said screen grid, a feedback network coupling said output resonant circuit to the control grid of said tube, said feedback network including a capacitor in series with a resistor connected between one end of said output resonant circuit and said cathode, said control grid being capacitively coupled to the junction of said capacitor and said resistor, the constants of said feedback network having values at which a 90 degree phase displacement exists between the voltage developed across said output resonant circuit and that developed across said resistor.

JACOB van SLOOTEN.

REFERENCES CITED

The following references are of record in the file of this patent:

UNITED STATES PATENTS

| Number | Name | Date |
| --- | --- | --- |
| 2,115,858 | Keall | May 3, 1938 |
| 2,276,832 | Dome | Mar. 17, 1942 |
| 2,374,781 | Schade | May 1, 1945 |

FOREIGN PATENTS

| Number | Country | Date |
| --- | --- | --- |
| 437,671 | Great Britain | Nov. 4, 1935 |

OTHER REFERENCES

RCA Laboratories Report LB-675 on "Television High Voltage R. F. Supplies" of August 15, 1946. Fig. 13 on page 12.